(12) United States Patent
Sokolihs et al.

(10) Patent No.: US 11,313,410 B2
(45) Date of Patent: Apr. 26, 2022

(54) SEALING BELLOWS FOR A BALL AND SOCKET JOINT COMPRISING SUCH A SEALING BELLOWS

(71) Applicant: ZF FRIEDRICHSHAFEN AG, Friedrichshafen (DE)

(72) Inventors: Dirk Sokolihs, Porta Westfalica (DE); Uwe Petersen, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 222 days.

(21) Appl. No.: 16/486,057

(22) PCT Filed: Jan. 15, 2018

(86) PCT No.: PCT/EP2018/050823
§ 371 (c)(1),
(2) Date: Aug. 14, 2019

(87) PCT Pub. No.: WO2018/149572
PCT Pub. Date: Aug. 23, 2018

(65) Prior Publication Data
US 2020/0056651 A1 Feb. 20, 2020

(30) Foreign Application Priority Data

Feb. 15, 2017 (DE) ...................... 10 2017 202 410.0

(51) Int. Cl.
*F16C 11/06* (2006.01)
*F16J 3/04* (2006.01)

(52) U.S. Cl.
CPC ........ *F16C 11/0671* (2013.01); *F16C 11/068* (2013.01); *B60G 2204/416* (2013.01); *F16J 3/046* (2013.01)

(58) Field of Classification Search
CPC .......................... F16C 11/0671; F16C 11/068; F16C 2326/05; F16C 2326/24; F16J 3/04; F16J 3/046; F16J 2326/05; F16J 2326/24; Y10S 277/928; B60G 2204/416
See application file for complete search history.

(56) References Cited

U.S. PATENT DOCUMENTS

| | | | |
|---|---|---|---|
| 2,835,521 A | 5/1958 | White | |
| 3,135,539 A * | 6/1964 | Ulderup | F16C 11/068 403/36 |
| 3,208,290 A * | 9/1965 | Thomas | F16C 11/0671 403/38 |
| 3,248,955 A | 5/1966 | Templeton | |

(Continued)

FOREIGN PATENT DOCUMENTS

| | | | |
|---|---|---|---|
| DE | 925 328 | 4/1955 | |
| DE | 1181014 B * | 11/1964 | F16J 3/046 |

(Continued)

*Primary Examiner* — Nicholas L Foster
(74) *Attorney, Agent, or Firm* — Cozen O'Connor (57) ABSTRACT

A sealing bellows for a ball joint having a housing-side sealing area, a stud-side sealing area, and an outlet opening arranged between the sealing areas and which penetrates a wall of the sealing bellows. The outlet opening is open in the unassembled state of the sealing bellows. The outlet opening is closed in the assembled state of a ball joint. The sealing bellows and/or the ball joint can be used for a multi-point link, particularly a two-point link.

18 Claims, 4 Drawing Sheets

(56) References Cited

U.S. PATENT DOCUMENTS

| | | | | |
|---|---|---|---|---|
| 4,003,666 A | * | 1/1977 | Gaines | F16C 11/068 403/36 |
| 4,003,667 A | * | 1/1977 | Gaines | F16C 11/068 403/36 |
| 5,568,930 A | * | 10/1996 | Urbach | F16C 11/0671 277/635 |
| 6,308,959 B1 | * | 10/2001 | Sokolihs | F16J 3/046 277/394 |
| 7,416,064 B2 | * | 8/2008 | Beck | F16F 9/38 188/322.12 |
| 7,862,250 B2 | * | 1/2011 | Kuru | F16C 11/0671 403/134 |
| 9,470,271 B2 | * | 10/2016 | Connor | F16D 3/845 |
| 10,563,692 B1 | * | 2/2020 | Reiff | F16J 3/046 |
| 10,780,756 B1 | * | 9/2020 | Reiff | B60G 7/005 |
| 2006/0012089 A1 | * | 1/2006 | Beck | F16F 9/38 267/64.27 |
| 2009/0232589 A1 | * | 9/2009 | Kuru | F16C 11/0628 403/134 |
| 2021/0001676 A1 | * | 1/2021 | Reiff | F16J 3/046 |

FOREIGN PATENT DOCUMENTS

| | | | |
|---|---|---|---|
| DE | 197 27 494 | 2/1999 | |
| DE | 198 50 378 | 3/2000 | |
| DE | 19850378 C1 * | 3/2000 | F16C 11/0671 |
| DE | 102005028754 A1 * | 4/2007 | F16J 3/046 |
| EP | 3583323 | 12/2019 | |
| FR | 2 350 500 | 12/1977 | |

\* cited by examiner

SEALING BELLOWS FOR A BALL AND SOCKET JOINT COMPRISING SUCH A SEALING BELLOWS

CROSS REFERENCE TO RELATED APPLICATIONS

This is a U.S. national stage of application No. PCT/EP2018/050823, filed on Jan. 15, 2018. Priority is claimed on German Application No. DE10 2017 202 410.0, filed Feb. 15, 2017, the content of which is incorporated here by reference.

BACKGROUND OF THE INVENTION

1. Field of the Invention

The invention is directed to a sealing bellows for a ball joint, to a ball joint with a sealing bellows of this kind, a method for assembling a ball joint of this kind, and a use of such sealing bellows and/or such ball joint.

2. Description of the Prior Art

Sealing bellows for ball joints are known from the prior art. Such ball joints are frequently employed in chassis parts or steering parts of motor vehicles. Sealing bellows of lubricatable ball joints, for example, for utility vehicles, often have lubricant outlet openings from which spent lubricating grease can exit. Lubricant outlet openings of this kind are constructed on principle as self-closing check valves through which the spent lubricating grease can exit from the sealing bellows, but dirt and/or moisture are prevented from entering the sealing bellows from the outside.

A ball joint with a sealing bellows having a lubricant outlet opening of this type is known from DE 197 27 494 A1. Spent lubricant can exit from the lubricant outlet opening of the sealing bellows after first overcoming a positive pressure inside the sealing bellows formed from an elastomer material. This lubricant outlet opening is formed as a slot penetrating a wall of the sealing bellows. Owing to elastic characteristics of the sealing bellows material, the slot is self-closing, i.e., the slot closes again automatically after spent lubricating grease exits. The positive pressure mentioned above is required for opening the slot and causes a separation of wall portions of the slot which contact one another during normal operation of the ball joint, i.e., when the ball joint has not just been relubricated. The required positive pressure is applied by relubricating the ball joint via a lubricating nipple, and the spent lubricant is displaced and pushed out of the lubricant outlet opening.

When the above-mentioned wall portions of the slot contact one another also in the unassembled state of the sealing bellows, this can result in unwanted impurities in the lubricant in the course of assembling the ball joint. Such lubricant impurities can occur when a ball joint provided with an initial lubricant filling is connected via a ball stud to a connection component part, for example, a steering arm, on the stud-side of the ball joint. Such connections are often carried out as tapered connections in which the ball stud has a conical connection portion, also referred to as conical portion, and the stud-side component part has a conical receiving bore corresponding in shape to the latter. As the result of an axial compression of the sealing bellows consequent upon assembly, lubricant can exit from a stud-side aperture of the sealing bellows, namely, via an annular gap remaining open between the conical connection portion of the ball stud and the stud-side aperture of the sealing bellows at the commencement of the axial compression. This can happen, for example, when the above-mentioned annular gap is clogged by lubricating grease of an initial lubricant filling of the ball joint during the compression of the sealing bellows.

In this case, entrapped air located inside the sealing bellows is prevented from escaping via the annular gap. When there is a further compression of the sealing bellows, the entrapped air is compressed so that a positive pressure builds up inside of the sealing bellows. The lubricating grease clogging the annular gap is pushed out of this annular gap by the positive pressure in direction of the conical connection portion of the ball stud because the positive pressure required to do this is less than the positive pressure required for opening the slot. However, a conical connection portion that is soiled by lubricating grease is not desirable because it reduces the friction coefficient of the tapered connection between the conical connection of the ball stud and the stud-side connection component part in an impermissible manner. This can have the result that the tapered connection is no longer able to transfer forces and/or torques determined on the basis of an unlubricated tapered connection. It is precisely in chassis parts or steering parts in motor vehicles that such weak points present a safety risk.

SUMMARY OF THE INVENTION

It is an object of one aspect of the invention to provide a sealing bellows for a ball joint that can be assembled in a reliable manner, particularly without the risk of impermissible lubricant impurities. It is a further object of the invention to provide an alternative embodiment form.

Accordingly, one aspect of the invention provides a sealing bellows for a ball joint, which sealing bellows has a housing-side sealing area and a stud-side sealing area spaced from the latter. The sealing bellows further has an outlet opening arranged between the housing-side sealing area and the stud-side sealing area and which also penetrates a wall of the sealing bellows.

According to one aspect of the invention, the outlet opening is open in an unassembled state of the sealing bellows. In this way, air entrapped in the sealing bellows during assembly of the ball joint can escape via the outlet opening, which functions in this case as air outlet opening, and an objectionable lubricant deposit on a conical portion of a ball stud of the ball joint can be reliably prevented. In particular, the sealing bellows is a ball joint sealing bellows and is expressly not a sealing bellows for a universal shaft, a driveshaft, a rolling element bearing, a constant velocity joint or the like. As used herein, a ball joint is a sliding bearing with a housing and a ball stud rotatably and swivelably movably mounted therein. The ball joint is preferably suitable for an installation in a motor vehicle, particularly for an installation in a chassis and/or a steering system of a motor vehicle. The ball stud comprises a joint ball supported in the housing and a stud which is rigidly connected to the latter. The stud is formed to be partially conical and extends out of the housing from a stud-side housing opening. The ball stud can be formed of one or more parts as a so-called composite ball joint with separate joint ball and a separate stud rigidly connected to the latter. The sealing bellows tightly contacts the housing by its housing-side sealing area in the region of the stud-side housing opening. The stud-side sealing area of the sealing bellows tightly contacts the stud of the ball stud in the assembled state of the ball joint.

The housing-side sealing area of the sealing bellows surrounds a housing-side opening thereof over the entire circumference. Likewise, the stud-side sealing area surrounds a stud-side opening of the sealing bellows. The sealing bellows has no further openings aside from these openings and the outlet opening. In particular, the sealing bellows comprises an elastically deformable material, for example, soft polymer material such as natural rubber or polyester-based or polyurethane-based thermoplastic elastomers, for example. The wall of the sealing bellows comprises a single-layer solid material in particular. The "unassembled state" of the sealing bellows means the shape of the sealing bellows when the sealing bellows presents as a uncompressed individual part, i.e., without being acted upon by external forces. The sealing bellows is preferably formed to be rotationally symmetrical with the exception of the outlet opening, and the housing-side sealing area is parallelly spaced from the stud-side sealing area. In particular, the sealing bellows has an individual bulging area between the housing-side sealing area and the stud-side sealing area. However, a plurality of bulging areas alternating with one or more waisted areas is also possible.

In particular, the bellows protection is constructed to be elastic and constructed to be dimensionally stable at the same time. By "constructed to be elastic" is meant within the framework of the invention that the sealing bellows has recovery properties as a result of which the sealing bellows tends to revert to its initial position after a deformation, for example, after a compression in axial direction of the sealing bellows. By "constructed to be dimensionally stable" is meant in this connection that the sealing bellows, as individual part, is inherently at least stable enough that it does not collapse as a result of its own weight when set down on a plane surface. When it is stated that the outlet opening is open in the unassembled state of the sealing bellows this should only be understood first of all to mean that this outlet opening is not constructed to be closed as is known from the prior art, but rather has a free cross section. The free cross section is suitable, for example, for a free passage of air without a pressure difference being required for this purpose. Beyond this, in the unassembled state of the sealing bellows, the outlet opening also allows the passage of lubricant. Owing to the relatively high viscosity of lubricating grease for ball joints, this lubricant generally does not flow through the outlet opening exclusively due to its gravitational force.

The outlet opening preferably has an unmachined inner circumferential surface that defines a contour of the outlet opening. In particular, the inner circumferential surface surrounds the free cross section of the outlet opening. The inner circumferential surface is preferably subjected to primary shaping, in particular is injection molded. In this connection, "unmachined inner circumferential surface" means that it remains in the rough state, i.e., for example, does not undergo any further machining after the injection molding. An outlet opening with an unmachined inner circumferential surface can be produced particularly favorably when it is primary-shaped, for example, injection molded. In this case, the sealing bellows together with the outlet opening can be produced in a single primary shaping work step.

Lubricant outlet openings which are known from the prior art and are formed as slots are generally incorporated in the wall of the sealing bellows by a separate, severing manufacturing process, particularly by cutting, following upon a primary shaping. These constructions have the disadvantage that the ends of the cut-in slots act as notches within the meaning of strength of materials theory. In motor vehicles, particularly in chassis and/or steering systems of motor vehicles, installed sealing bellows are subject to different stresses in driving operation. Swiveling of the ball stud leads to alternating tensile and compressive strain in the slot. Rotational movements of the ball stud cause a torsional stress in the sealing bellows and, beyond this, a shearing stress in the ends of the slot. During driving operation, oscillations are superposed on the types of stress mentioned above. With cut-in slots, this frequently leads to increased notch stresses at the ends of the slot, as a result of which the slot can undesirably tear further. In contrast, if the outlet opening is primary-shaped, particularly injection molded, this problem does not occur or is at least sharply curtailed because the elastomeric or elastomer-like molecular structure of the sealing bellows is not destroyed in this case by cutting. Accordingly, the problem of preventing a tearing of the outlet opening can be solved by one aspect of the invention.

The outlet opening is advantageously formed as a gap that is open particularly in the unassembled state. In this context, "gap" means a three-dimensional, particularly open, aperture, which forms an intermediate space, is narrow and also elongated. A gap has the advantage that it can be closed easily by compressing so that the valve-like effect described earlier can be achieved in the installed state. In particular, the gap extends longitudinally in circumferential direction of the sealing bellows at least substantially perpendicular to the central axis of the sealing bellows.

The outlet opening advisably has two partial surfaces oriented parallel to one another and are spaced apart from one another. The two partial surfaces are preferably parallelly spaced in axial direction of the sealing bellows, and the partial surfaces can be constructed, by themselves, to be planar or non-planar, for example, corrugated. The advantage in the partial surfaces being parallelly spaced apart is that the outlet opening is closed uniformly when there is an axial compression, particularly in the installed state of the sealing bellows. The clearance, i.e., the distance between the two parallelly spaced-apart partial surfaces, depends upon the dimensions of the sealing bellows and is preferably in the range of a few tenths of a millimeter. The two parallelly spaced-apart partial surfaces are a component part of the inner circumferential surface of the outlet opening.

The outlet opening preferably opens into a blind hole-like pocket that is recessed into the wall of the sealing bellows on the inner side of the sealing bellows. Accordingly, the outlet opening does not penetrate the wall completely but only partially, and the remaining part of the wall is penetrated by the pocket. This has the advantage that the outlet opening is easily compressible so as to achieve the valve effect described earlier. In particular, the pocket has a central axis extending in axial direction of the sealing bellows. The pocket is preferably incorporated in a thickened portion of the wall. With the exception of the outlet opening which is arranged in the area of the pocket and, together with the latter, allows the lubricant to exit, the outer circumferential surface of the sealing bellows is preferably constructed so to be uninterrupted.

One of the two parallelly spaced-apart partial surfaces preferably transitions into a base surface of the pocket without interruption and/or continuously. The partial surface and the base surface are formed in particular to be planar and oriented perpendicular to the central axis of the sealing bellows. As a result of this arrangement, spent lubricant can be carried out of the sealing bellows in a simple manner because the surfaces to be passed collectively form a plane and therefore offer only a slight resistance to the spent lubricant flowing out.

Further, it can be provided that the depth of the outlet opening is less than one third of the wall thickness of the sealing bellows in the area of the outlet opening and, in cooperation with the pocket (13), a continuously open connection is provided between the inner side and outer side of the sealing bellows (1). This facilitates a pressing together of the outlet opening in the assembled state of the sealing bellows, particularly when the outlet opening is formed as a gap with two parallelly spaced-apart partial surfaces.

The outlet opening is advantageously arranged in the area of the stud-side sealing area and/or in an area adjacent to the stud-side sealing area (7). Fresh lubricant is supplied to the housing of the ball joint via a lubricating nipple and pushes lubricant already present inside the ball joint in direction of the sealing bellows. Within the housing, the lubricant is mixed with debris from the sliding bearing points present therein and is then pushed out of the housing into the housing-side opening of the sealing bellows as spent lubricant. The spent lubricant is pushed in direction of the stud-side sealing area by further succeeding lubricant. The outlet opening is arranged at the end of the path traveled by the lubricant inside the ball joint and also at the farthest possible distance from the sliding bearing points inside the housing. In this way, it is ensured that spent lubricant cannot return to the sliding bearing points inside the housing. The spent lubricant mixed with debris, also referred to as contaminated lubricant, acts abrasively and would therefore lead to increased wear inside the sliding bearing points.

When the spent lubricant is pushed through the outlet opening by succeeding lubricant, the outlet opening functions as lubricant outlet opening. The outlet opening accordingly differs from the lubricant outlet openings known from the prior art in that they can act as lubricant outlet opening on the one hand and, beyond this, can also act as air outlet opening, namely, in the unassembled state of the sealing bellows. Strictly speaking, the outlet opening can also act as air outlet opening in the partially assembled state of the sealing bellows because, during the axial compression of the sealing bellows in direction of an end position occupied by the sealing bellows in the assembled state, the outlet opening gradually closes and is only completely closed when the end position is reached.

The outlet opening is advantageously arranged in axial direction at the height of the stud-side sealing area. As has already been mentioned, this prevents contaminated lubricant from returning to the sliding bearing surfaces of the ball joint because the outlet opening and the sliding bearing surfaces are as far apart as possible.

More than two outlet openings are preferably arranged to be distributed along the circumference of the sealing bellows. This ensures that spent lubricant together with the debris particles contained therein is reliably removed from the sealing bellows. Three outlet openings are preferably arranged to be distributed along the circumference of the sealing bellows in a uniform manner, i.e., with a spacing of 120 degrees in each instance.

The outlet opening is advisably oriented in a radial direction of the sealing bellows. The radial direction extends perpendicular to the axial direction and simultaneously perpendicular to the central axis of the sealing bellows. The radial orientation of the outlet opening ensures that the spent lubricant will exit laterally from the sealing bellows. With an axial extension of the outlet opening, the latter could become clogged in certain operating states of the ball joint, particularly when the sealing bellows has a plurality of bulging portions and waisted portions or is supported on a stud-side connection component part.

The outlet opening is advantageously formed free from undercuts with reference to a mold parting plane extending through the central axis of the sealing bellows. In this way, it is possible to produce the sealing bellows in a single production step, particularly injection molding. Further, the removability of the sealing bellows from the mold after primary shaping, particularly injection molding, is ensured without requiring mold dies with expensive tool slides. In particular, the outer circumferential surface of the sealing bellows has two mold parting flashes extending in axial direction at the cut line between the mold parting plane and the outer circumference.

The invention is further directed to a ball joint, particularly a lubricatable ball joint, with a sealing bellows as described above, wherein the outlet opening is open in the unassembled state of the ball joint and is closed in the assembled state of the ball joint. The closing of the outlet opening is brought about in the course of assembly in that the sealing bellows is compressed in axial direction by placing the stud-side connection component part, for example, of a steering arm, on the stud of the ball stud.

The upper partial surface and the lower partial surface of the outlet opening advantageously contact one another in the assembled state of the ball joint.

The invention is further directed to a method for assembling a ball joint, described above, wherein the air trapped in the sealing bellows can escape from the at least partially open outlet opening during an axial compression of the sealing bellows by a stud-side connection component part. By trapped air being able to escape from the at least partially open outlet opening is meant that the outlet opening gradually progressively closes during the axial compression of the sealing bellows in direction of the end position thereof in the assembled state of the ball joint and is completely closed only when the end position has been reached.

A further aspect of the invention is directed to a use of the above-mentioned sealing bellows and/or of the above-mentioned ball joint for a multi-point link, particularly a two-point link, having at least one such sealing bellows and/or having at least one such ball joint. In particular, the multi-point link is constructed as a two-point link with at least one sealing bellows and/or a ball joint such as that described above and a rod-like connection element rigidly connected thereto. The connection element can be formed as a straight pipe or as a curved pipe. Alternatively, the two-point link can also have two ball joints of the type described above at the ends, which ball joints are rigidly connected to the connection element. The two-point link can be constructed as steering rod, tie rod, Panhard rod, connecting rod for connecting an anti-roll stabilizer to a vehicle frame, or as connecting rod for the articulated connection of two steering parts, for example, two steering arms. The two-point link can have a fixed length or a variable length.

BRIEF DESCRIPTION OF THE DRAWINGS

The invention will be described in more detail in the following referring to drawings depicting a sole embodiment example Like reference numerals denote like component parts or elements. The drawings show.

DETAILED DESCRIPTION OF THE PRESENTLY PREFERRED EMBODIMENTS

Figure 1:
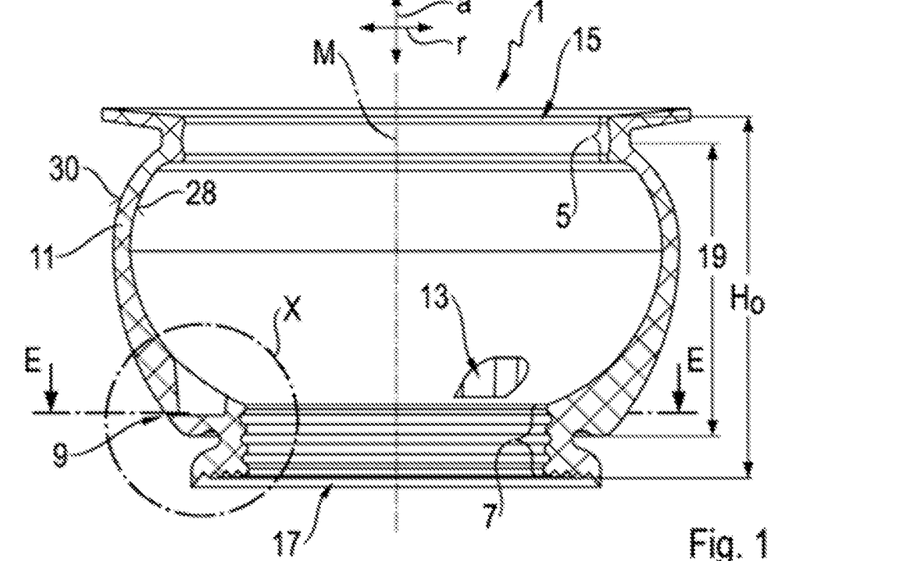
FIG. 1 is a sealing bellows according to the invention in half-section.

FIG. 1 shows in unassembled state a rotationally symmetrical sealing bellows 1 for a ball joint 3, wherein the rotational symmetry is interrupted by an outlet opening 9. The sealing bellows 1 has a housing-side sealing area 5 and a stud-side sealing area 7 parallely spaced apart in an axial direction a. Outlet opening 9 which penetrates a wall 11 of sealing bellows 1 is arranged between the housing-side sealing area 5 and the stud-side sealing area 7. Outlet opening 9 is open in the unassembled state of sealing bellows 1 shown in the drawing. Considered from the outside, outlet opening 9 opens into a blind hole-like pocket 13, which is recessed into the wall 11 of the sealing bellows 1 on the inner side of the sealing bellows 1. There is a total of three pockets 13 arranged so as to be distributed uniformly, i.e., with a spacing of 120 degrees in each instance, along the circumference of sealing bellows 1, only two of which are discernible in the half-section according to FIG. 1. A view through a housing-side opening 15 which is surrounded by the housing-side sealing area 5 looks into the pockets 13, which open toward the housing-side opening 15, the imaginary central axis of these pockets 13 extending in axial direction a of sealing bellows 1.

Like the housing-side sealing area 5 and sealing bellows 1, the stud-side sealing area 7 surrounds a stud-side opening 17 of sealing bellows 1 and is formed rotationally symmetrically in its entirety with respect to a central axis M of sealing bellows 1. The housing-side sealing area 5 and the stud-side sealing area 7 constitute a component part of the inner circumferential surface 28 of the sealing bellows 1. In the half-section, stud-side sealing area 7 has a wavy contour extending in axial direction a, whereas housing-side sealing area 5 merely has a bulging portion when considered in half-section. In the uncompressed state of the sealing bellows 1 shown in FIG. 1, this sealing bellows 1 has an uncompressed height $H^0$ measured in axial direction a, which uncompressed height H clamps the housing-side sealing area 5 and the stud-side sealing area 7. Sealing bellows 1 has a bulging portion 19 substantially between the housing-side sealing area 5 and the stud-side sealing area 7. The bulge of this bulging portion 19 extends outward in a radial direction r running perpendicular to axial direction a.

Figure 2:
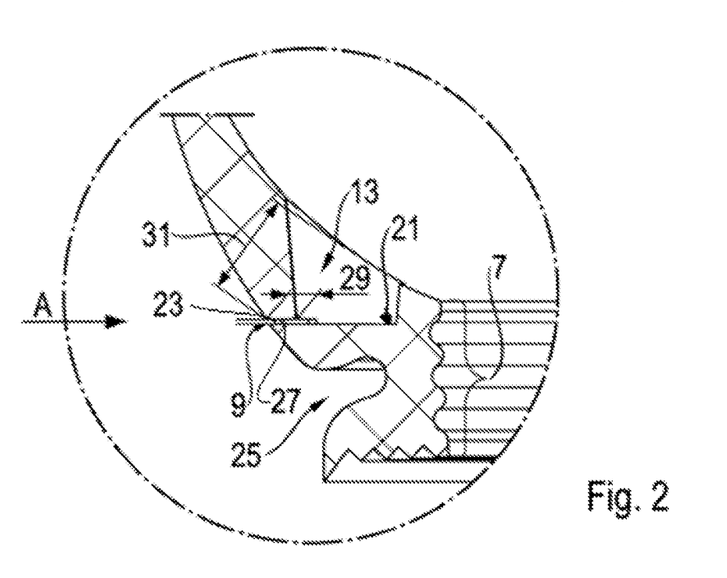
FIG. 2 is an enlarged detail view of detail X from FIG. 1.

It will be appreciated from FIG. 2 that a base surface 21 of pocket 13 is planar and extends perpendicular to the central axis M of sealing bellows 1, i.e., in radial direction r. Proceeding from the base surface 21, pocket 13 widens continuously in cross section in axial direction a so that pocket 13 can be removed from the mold after injection molding. As a result of pocket 13, which is recessed into a thickened portion of wall 11, the wall thickness at this location of wall 11 is reduced. Sealing bellows 1 has a circumferential clamping ring groove 25 at a distance in axial direction a from base surface 21 and at approximately the same height as the latter in the radial direction r.

Clamping ring groove 25 is part of the outer circumferential surface 30 of sealing bellows 1 and is formed as an indentation which extends in direction of the stud-side opening 17 and is arranged in axial direction a approximately at the height of the axial center of the stud-side sealing area 7. Like base surface of 21 of pocket 13, a lower partial surface 23 of outlet opening 9 extends in radial direction r and transitions into the latter free from interruption. Lower partial surface 23 and base surface 21 of pocket 23 are situated at the height of the stud-side sealing area 7 in axial direction a.

In addition to the lower partial surface 23, outlet opening 9 has an upper partial surface 27 parallel to and at a distance from the latter. The clearance between the two parallelly spaced-apart partial surfaces 23, 27 is a few tenths of a millimeter. The two parallelly spaced-apart partial surfaces 23, 27 are a component part of the inner circumferential surface 35 of outlet opening 9. The depth 29 of outlet opening 9 is less than one third of the wall thickness 31 of sealing bellows 1 in the area of outlet opening 9. In the half-section according to FIG. 1 and FIG. 2, the depth 29 of outlet opening 9 extends from the intersection point of the outer circumferential surface 30 with the upper partial surface 27 in radial direction r to the intersection point of the upper partial surface 27 with the inner wall of pocket 13. In the same view, the wall thickness 31 presents the shortest distance between the intersection point of outer circumferential surface 30 with upper partial surface 27 and the inner circumferential surface 28 of the sealing bellows 1.

Figure 3:
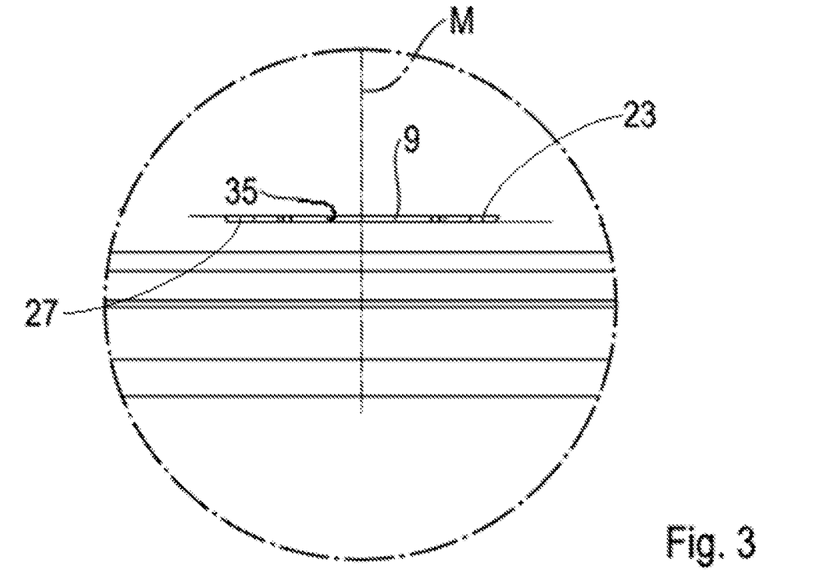
FIG. 3 is a detail view of an outlet opening of the sealing bellows according to view A from FIG. 2 and FIG. 4.

FIG. 3 shows a section of a side view of the injection-molded sealing bellows 1 viewed in the de-molding direction 33 thereof. The de-molding direction 33 extends perpendicular to the drawing plane. In this view, outlet opening 9 is arranged symmetrical to the central axis M of sealing bellows 1 because it extends in de-molding direction 33. Outlet opening 9 has an unmachined inner circumferential surface 35 and is formed as a gap 9, which extends in radial direction r into pocket 13. The lower partial surface 23 and the upper partial surface 27 parallelly spaced apart from the latter are a component part of inner circumferential surface 35.

Figure 4:
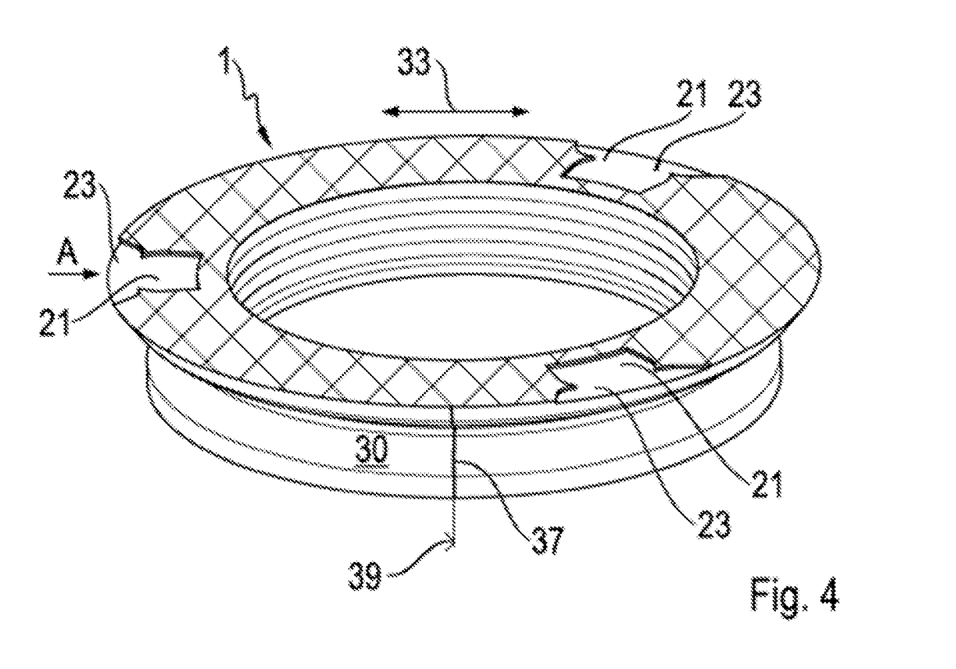
FIG. 4 is section E-E from FIG. 1 in a sectional view.

FIG. 4 shows that the lower partial surface 23 of outlet opening 9 transitions into the base surface 21 of pocket 23 without interruptions and continuously and that a total of three pockets 13 are arranged so as to be distributed along the circumference of sealing bellows 1 in a uniform manner, i.e., with a spacing of 120 degrees in each instance. As has already been stated referring to FIG. 3, the outlet opening 9, which can be seen on the left-hand side, is formed symmetrically. The symmetry described referring to FIG. 3 is not present in the two outlet openings 9, shown on the right-hand side, which do not extend perpendicular to de-molding direction 33. However, like the outlet opening 9 on the left-hand side, the outlet openings 9 on the right-hand side are formed without undercuts with respect to a mold parting plane 39 extending through the central axis M of sealing bellows 1. At two lines intersecting with the mold parting plane 39, which extends perpendicular to de-molding direction 33 and, at the same time, runs through the central axis M of sealing bellows 1, the outer circumferential surface 30 of sealing bellows 1 has two mold parting flashes 37 extending in axial direction a, one of which is visible and the other hidden.

Figure 5:
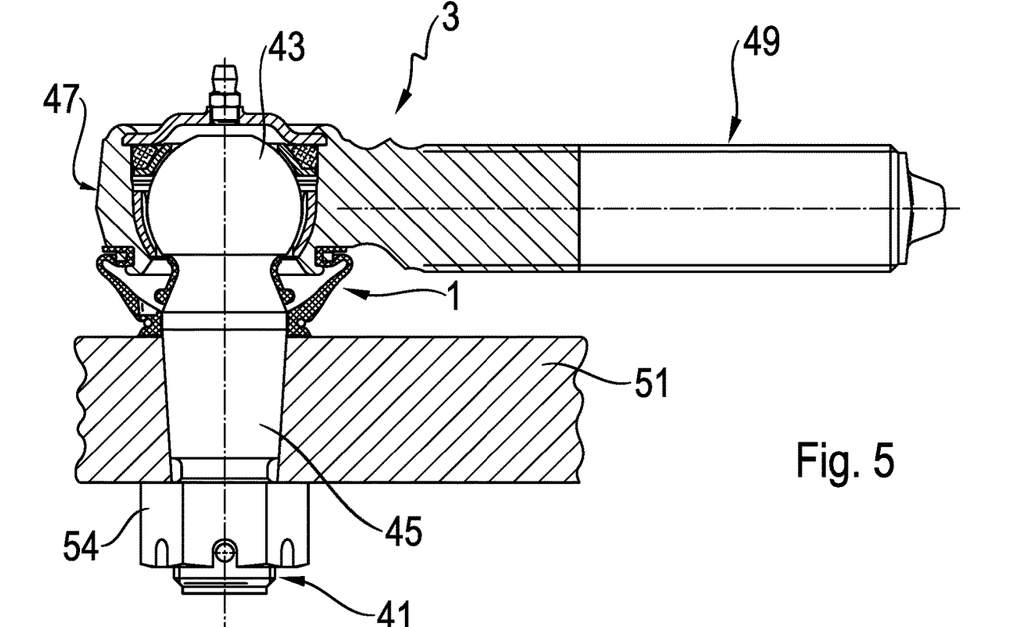
FIG. 5 is a ball joint in a sectional view.

The ball joint 3 which has already been mentioned is shown in FIG. 5. This is a ball joint 3 for a motor vehicle, particularly for a chassis or a steering system of a motor vehicle. It has a balls stud 41 formed in one piece from a joint ball 43 and a stud 45. The joint ball 43 is slidingly supported in a housing 47 of ball joint 3 so as to be rotatably and swivelably movable. A shaft 49 is formed integral with housing 47 and is provided over most of its length with an external thread which is suitable for connecting the ball joint 3 to a shaft-side connection component part 67, not shown here. The stud 45 is connected to a stud-side connection component part 51, which is formed in this instance as a steering arm 51. The connection is formed as a conical seat. To this end, stud 45 has a conical portion that fits in a conical bore hole of the steering arm 51 corresponding in shape. The connection is secured via a nut which is formed as a castellated nut 54 that pulls the conical portion of stud 45 into the conical bore hole of the steering arm 51. In this end position which is occupied by the sealing bellows 1 in the completely assembled state of the ball joint 3, outlet opening 9 is completely closed.

Figure 6:
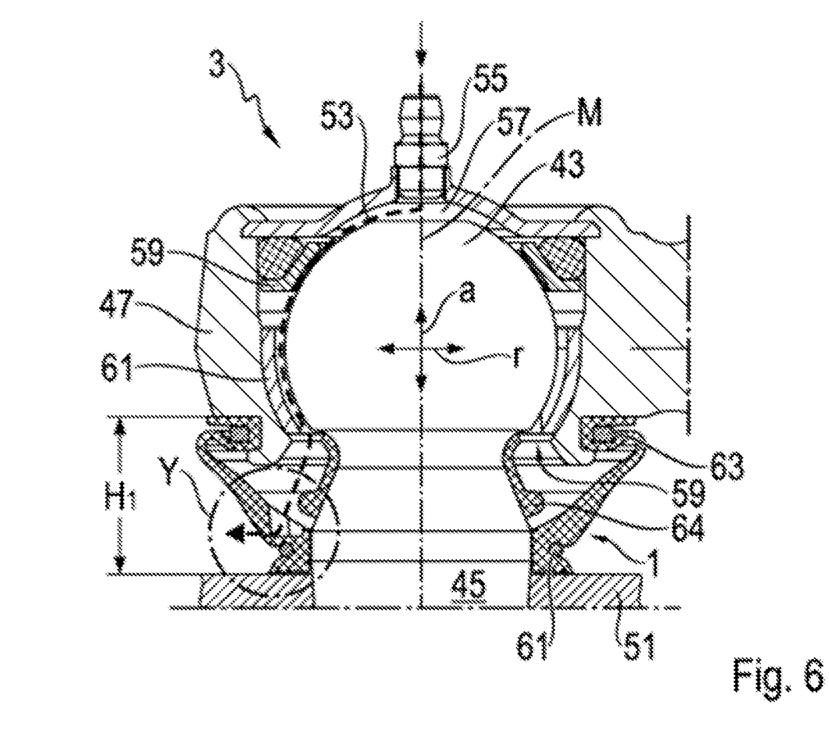
FIG. 6 is a portion of the ball joint from FIG. 5 in an enlarged view.

FIG. 6 shows the sealing bellows 1 in the assembled state. The sealing bellows 1 has in axial direction a an assembled elevated height $H_1$ which is less than the uncompressed height $H_0$ in the unassembled state. The reason for this is that the sealing bellows 1 is pushed against housing 47 by steering arm 51 in the course of assembling the ball joint 3 so that the height of the sealing bellows 1 measured in axial direction a is reduced. As a result, outlet opening 9, which is open in the unassembled state of sealing bellows 1, is likewise pressed together and is now closed. It can be seen, inter alia, at a lubricating nipple 55, which is arranged in the area of a flattened polar location of the joint ball 43, that the ball joint 1 is a lubricatable ball joint.

For purposes of illustration, the path traveled by the lubricant 53 inside of ball joint 3 is shown schematically as a dashed line. In this application, the lubricant is a lubricating grease 53 with relatively high viscosity. Fresh lubricating grease 53 is pressed via lubricating nipple 55 into an upper lubricant chamber 57, generally by a grease gun. Proceeding from upper lubricant chamber 57, it is pushed farther along the surface of the joint ball 43 by succeeding lubricating grease 53 and is pressed, inter alia, through lubricant grooves of an upper bearing shell 59 and a lower bearing shell 61, which lubricant grooves extend in axial direction a. In driving operation, the lubricating grease 53 is mixed with debris particles due to relative movements between the upper bearing shell 59 and lower bearing shell 61. In this way, the lubricating grease 53 which was initially fresh becomes spent lubricating grease 53. When ball joint 3 is re-lubricated again, the spent lubricating grease 53 is pushed through an annular gap between ball stud 41 and a stud-side housing opening 59 and then collects in the sealing bellows 1.

When sealing bellows 1 is completely filled with spent lubricating grease 53, a further supply of lubricant through lubricating nipple 55 causes a positive pressure to build up inside of housing 47. Outlet opening 9 is effectively pushed open by this positive pressure so that the excess spent lubricating grease 53 which cannot be absorbed by housing 47 or sealing bellows 1 escapes through outlet opening 9.

The clamping ring groove 25 of sealing bellows 1 receives a clamping ring 61 which has a round cross section and which pushes the stud-side sealing area 7 tightly against ball stud 41. The housing-side sealing area 5 of sealing bellows 1 is pressed into a circumferential outer groove of housing 47 in the area of the stud-side housing opening 59 by a clamping ring 63 having a square cross section. The transition from joint ball 43 to stud 45 of ball stud 41, also referred to as stud neck, is surrounded by a supporting ring 64 formed of plastic. Supporting ring 64 prevents the stud-side end of sealing bellows 1 from being drawn into the stud neck during extreme deflections of ball stud 41, this stud neck having a smaller diameter than the stud 45.

Figure 7:
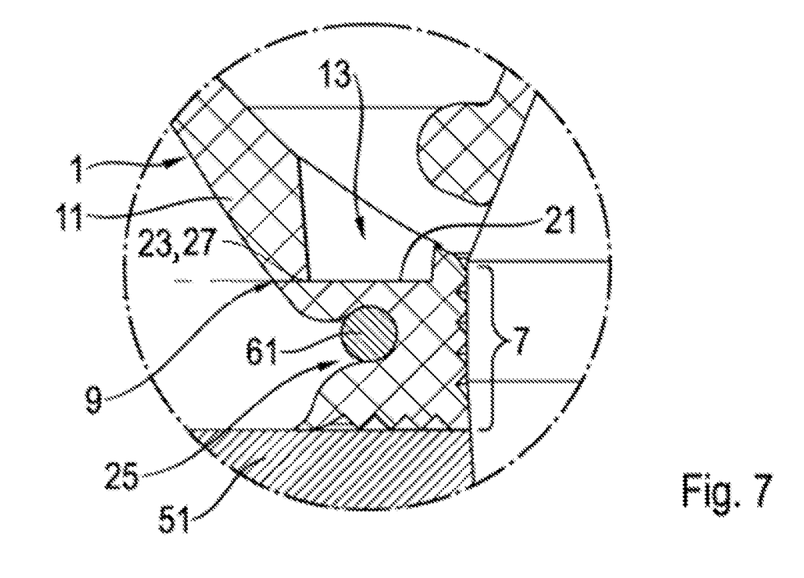
FIG. 7 is a detail Y from FIG. 6 in an enlarged detail view.

As can clearly be seen from FIG. 7, outlet opening 9 is closed in the assembled state of ball joint 3, and the upper partial surface 27 and lower partial surface 23 of the outlet opening formed as gap 9 in the unassembled state of sealing bellows 1 now contact one another.

Figure 8:
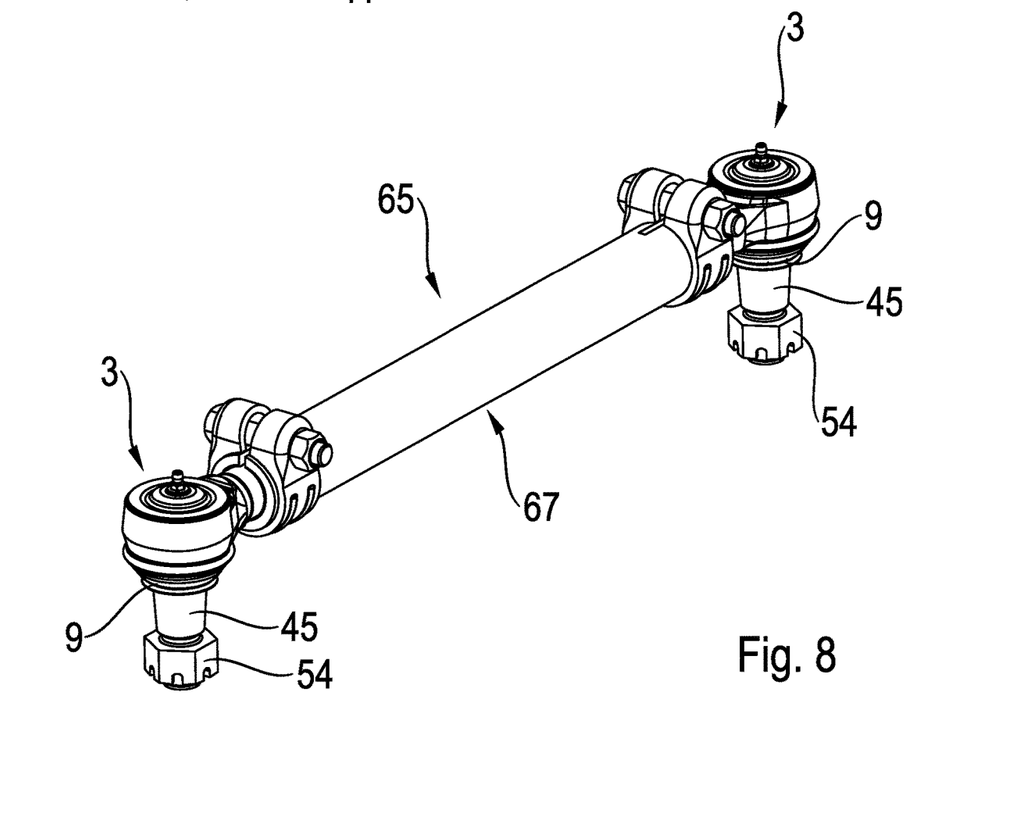
FIG. 8 is a two-point link according to the invention in a perspective view.

FIG. 8 shows a multi-point link which is formed as two-point link 65 with two lubricatable ball joints 3, as described earlier, which are connected to one another via a rod-like connection element formed as connection pipe 67. Connection pipe 67 simultaneously forms the shaft-side connection component part, which has already been mentioned. Each of the two ball joints 3 is seated with shaft 49 in an end portion of connection pipe 67, both end portions of connection pipe 67 having a longitudinal slot. The end portions of connection pipe 67 are extensively pressed against the shaft 49 of ball joints 3 by a clamp in each instance, and rigid connections between connection pipe 67 and ball joints 3 are produced in this way.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sealing bellows for a ball joint, comprising:
   a housing-side sealing area;
   a stud-side sealing area spaced from the housing-side sealing area;
   a wall of the sealing bellows between the housing-side sealing area and the stud-side sealing area has a concave inner surface; and
   an outlet opening arranged between the housing-side sealing area and the stud-side sealing area and which penetrates the wall of the sealing bellows formed by an upper partial surface and a lower partial surface,
   wherein the outlet opening is open in an unassembled state of the sealing bellows such that the upper partial surface and the lower partial surface are spaced apart from one another, and
   wherein the upper partial surface and the lower partial surface of the outlet opening contact one another in an assembled state mounted on the ball joint,
   wherein the upper partial surface and the lower partial surface extend substantially perpendicularly with respect to a longitudinal axis of the sealing bellows.

2. The sealing bellows according to claim 1, wherein the outlet opening has an unmachined inner circumferential surface that defines a contour of the outlet opening.

3. The sealing bellows according to claim 1, wherein the outlet opening is formed as a gap.

4. The sealing bellows according to claim 1, wherein the two partial surfaces are oriented parallel to one another and are planar surfaces.

5. The sealing bellows according to claim 1, further comprising:
a blind hole-like pocket that is recessed into the wall of the sealing bellows on an inner side of the sealing bellows,
wherein the outlet opening opens into the blind hole-like pocket.

6. The sealing bellows according to claim 5,
wherein the two partial surfaces are oriented parallel to one another and are spaced apart from one another, and
wherein one of the two parallelly spaced-apart partial surfaces transitions into a base surface of the pocket at least one of uninterrupted and continuously.

7. The sealing bellows according to claim 4,
wherein a depth of the outlet opening is less than one third of a wall thickness of the sealing bellows in an area of the outlet opening, and
wherein, in cooperation with the pocket, a continuously open connection is provided between an inner side and an outer side of the sealing bellows.

8. The sealing bellows according to claim 1, wherein the outlet opening is arranged in at least one of an area of the stud-side sealing area and an area adjacent to the stud-side sealing area.

9. The sealing bellows according to claim 1, wherein the outlet opening is arranged in an axial direction of the sealing bellows at a height of the stud-side sealing area.

10. The sealing bellows according to claim 1, wherein more than two outlet openings are arranged to be distributed along a circumference of the sealing bellows.

11. The sealing bellows according to claim 1, wherein the outlet opening is oriented in a radial direction of the sealing bellows.

12. The sealing bellows according to claim 5, wherein the outlet opening is formed free from undercuts other than the pocket.

13. The sealing bellows according to claim 1, further comprising:
a clamping ring groove arranged at the stud-side sealing area,
wherein the outlet opening is arranged proximate to the clamping ring groove and a first end of the concave inner surface.

14. The sealing bellows according to claim 1, wherein the outlet opening is a radially directed arcuate slit on an outer circumference of the sealing bellows.

15. A ball joint, configured as a lubricatable ball joint, comprising:
a sealing bellows, comprising:
a housing-side sealing area;
a stud-side sealing area spaced from the housing-side sealing area;
a wall of the sealing bellows between the housing-side sealing area and the stud-side sealing area has a concave inner surface; and
an outlet opening arranged between the housing-side sealing area and the stud-side sealing area and which penetrates the wall of the sealing bellows formed by an upper partial surface and a lower partial surface,
wherein the outlet opening is open in an unassembled state of the sealing bellows such that the upper partial surface and the lower partial surface are spaced apart from one another, and
wherein the upper partial surface and the lower partial surface of the outlet opening are in direct contact with one another in an assembled state of the ball joint.

16. The ball joint according to claim 15, wherein the ball joint is a multi-point link, configured as a two-point link.

17. The sealing bellows according to claim 15, wherein the outlet opening partial surfaces are planar and oriented parallel to one another.

18. A method for assembling a ball joint comprising:
installing a sealing bellows between a ball joint and a ball joint mount;
axially compressing the sealing bellows by a stud-side connection component part,
wherein air trapped in the sealing bellows can escape from an at least partially open outlet opening during the axial compression of the sealing bellows,
wherein the outlet opening is open in an unassembled state of the sealing bellows such that an upper partial surface and a lower partial surface are spaced apart from one another, and
wherein the upper partial surface and the lower partial surface of the outlet opening contact one another in an assembled state mounted on the ball joint,
wherein the upper partial surface and the lower partial surface extend substantially perpendicularly with respect to a longitudinal axis of the sealing bellows.

* * * * *